United States Patent [19]

Yanker

[11] Patent Number: 5,187,776
[45] Date of Patent: Feb. 16, 1993

[54] IMAGE EDITOR ZOOM FUNCTION

[75] Inventor: Peter C. Yanker, Portola Valley, Calif.

[73] Assignee: International Business Machines Corp., Armonk, N.Y.

[21] Appl. No.: 367,159

[22] Filed: Jun. 16, 1989

[51] Int. Cl.$^5$ ............................ G06F 3/14; G09G 5/34
[52] U.S. Cl. ..................................... 395/157; 395/161; 395/139; 340/724; 340/726; 340/721
[58] Field of Search ............... 364/521, 518; 340/721, 340/731, 726, 724; 382/47; 395/157, 161, 155, 139, 147, 146

[56] References Cited

U.S. PATENT DOCUMENTS

| | | | |
|---|---|---|---|
| Re. 31,200 | 4/1983 | Sukonick et al. | 340/724 |
| 4,148,073 | 4/1979 | Slobodzian | 358/240 |
| 4,503,427 | 3/1985 | Iida | 340/731 |
| 4,528,642 | 7/1985 | Waller | 364/900 |
| 4,532,605 | 7/1985 | Waller | 364/900 |
| 4,533,910 | 8/1985 | Sukonick et al. | 340/721 |
| 4,546,349 | 10/1985 | Prohofsky et al. | 340/731 |
| 4,694,345 | 9/1987 | Rodgers | 358/216 |
| 4,720,703 | 1/1988 | Schnarel, Jr. et al. | 340/709 |
| 4,734,690 | 3/1988 | Waller | 340/729 |
| 4,751,507 | 6/1988 | Hama et al. | 340/724 |
| 4,785,296 | 11/1988 | Tabata et al. | 340/731 |
| 4,800,379 | 1/1989 | Yeomans | 340/731 |
| 4,821,031 | 4/1989 | Roberts | 340/731 |

OTHER PUBLICATIONS

PC Storyboard, International Business Machines Corporation, First Edition, Mar. 1985, pp. 85-88.
Microsoft Windows Paint User's Guide (Version 2.0), 1987, pp. (3-31)-(3-34).

*Primary Examiner*—Heather R. Herndon
*Assistant Examiner*—Raymond J. Bayerl
*Attorney, Agent, or Firm*—Perman & Green

[57] ABSTRACT

An Image Editor includes a ZOOM function wherein other Image Editor actions are invokable and operable in whatever zoom level is currently in effect. The zoom mode is a state of the Image Editor in that invoked actions are performed in a normal 1X pel size image but are displayed to an operator in an enlarged, flat pel, zoom equivalent. Whe the ZOOM function is invoked a displayed zoom window is automatically centered upon a present position of a cursor as is also a selectively displayable viewport, the viewport showing the relative position of the cursor within the 1X image.

1 Claim, 3 Drawing Sheets

IMAGE EDITOR ZOOM FUNCTION

FIELD OF THE INVENTION

This invention relates generally to visual display methodology and, in particular, to a method of displaying with a zoom function a magnified portion of an image.

BACKGROUND OF THE INVENTION

In a publication entitled "Using PC Storyboard", Information Update SN60-1796, November 1985, published by the IBM Corporation, Armonk, N.Y., there is described at pages 85-88 the functionality of a zoom, or image magnification, function for an applications program entitled "PC Storyboard". While providing for individual pel, or pixel, enlargement this prior art zoom function does not center the the zoom function at the cursor position upon the display screen. This prior art zoom function also does not scroll a zoom viewport that displays an unmagnified view of the zoomed image portion.

It is thus an object of the invention to provide a zoom function that centers the magnified portion of a visual image upon a display cursor.

It is another object of the invention to provide a zoom function having a viewport that scrolls through an image as a cursor is moved.

SUMMARY OF THE INVENTION

The foregoing problems are overcome and the objects of the invention are realized by a method of operating an Image Editor having a zoom function wherein other Image Editor actions are invokable and operable in whatever zoom level is currently in effect. The zoom mode is a state of the Image Editor in that invoked actions are performed in a normal 1X pel size image but are displayed to an operator in an enlarged, fat pel, zoom equivalent. When the ZOOM function is invoked a displayed zoom window is automatically centered upon a present position of an indicator, or cursor, as is also a selectively displayable viewport for showing the relative position of the cursor within the 1X image.

A method of the invention of operating an Image Editor in response to input from a user includes the steps of entering a zoom mode of operation wherein a displayed image is magnified and storing in a memory an unmagnified copy of the image. The method further includes the steps of, responsive to an indicator positioned by the user within the displayed image, determining the indicator position in coordinates associated with the unmagnified image, determining a magnification level currently in effect and determining a required display size of a display screen pel magnified to the current magnification level. Responsive to the determined indicator position and to a predetermined maximum display size the method includes a step of determining coordinates, relative to the unmagnified image, of a first window defining a portion of the image to be displayed as a magnified image. The first window coordinates are determined such that the indicator position is located substantially at a center of the first window. An additional step of displaying the magnified portion of the image within the first window is accomplished, the magnified portion being displayed with the magnified pel size. The method also determines coordinates within the unmagnified image of a second window for defining a portion of the image to be displayed as an unmagnified image, the indicator position being located substantially at a center of the second window. The second window is displayed or is not displayed depending upon input from the user.

BRIEF DESCRIPTION OF THE DRAWINGS

The above set forth and other features of the invention will be made more apparent in the ensuing Detailed Description of the Invention when read in conjunction with the attached Drawings, wherein.

DETAILED DESCRIPTION OF A PREFERRED EMBODIMENT OF THE INVENTION

The following description of the invention is made in the context of an audio/visual application processor implemented on an IBM TM PS/2 TM computer system (IBM and PS/2 are trademarks of the IBM Corporation of Armonk, N.Y.). It should be realized though that the teaching of the invention may be practiced with a number of different types of information processing systems in support of a number of different types of application programs that provide a visual display.

Figure 1:
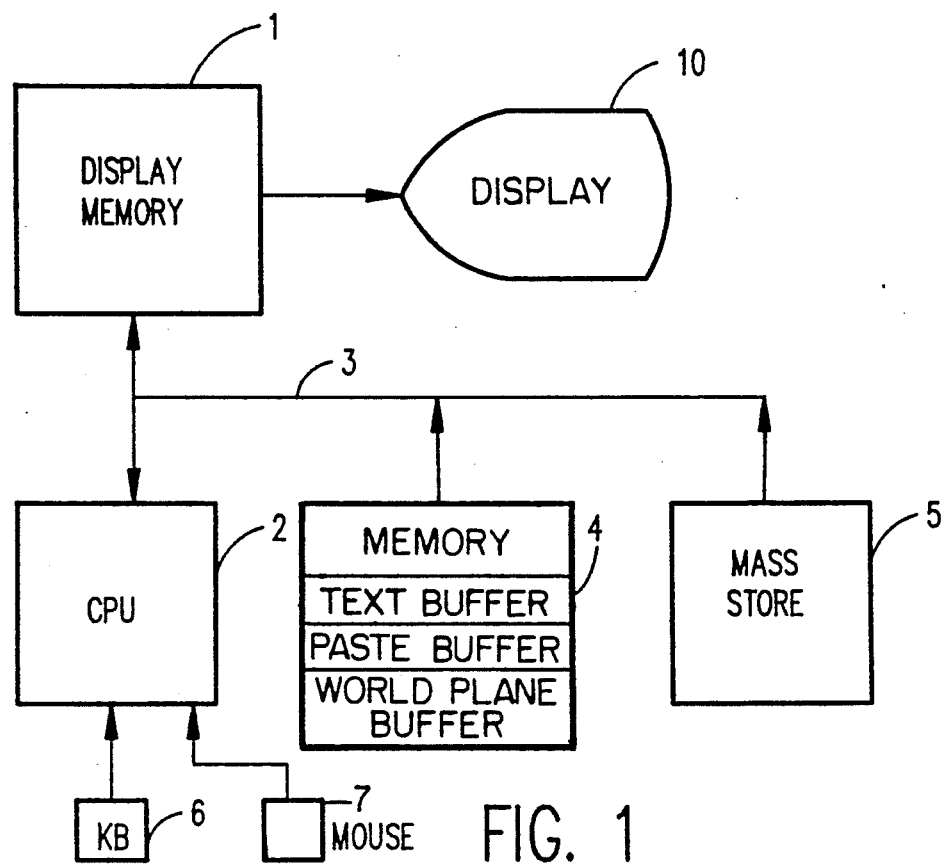
FIG. 1 is a block diagram of an information processing system embodying the invention.
Figure 2:
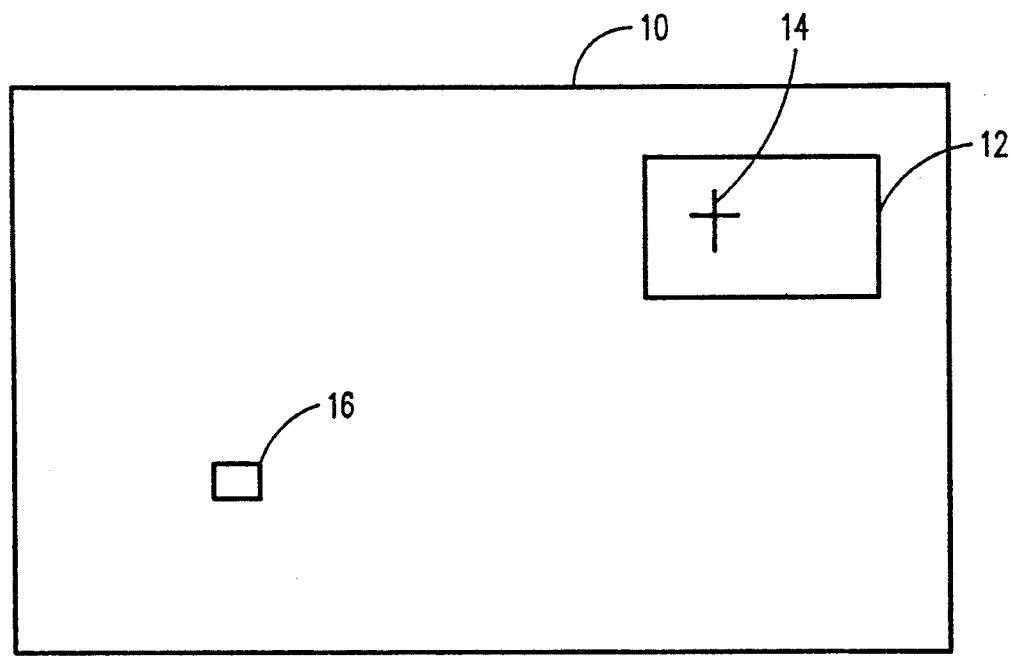
FIG. 2 shows in detail the organization of the display screen of FIG. 1.

Referring first to FIG. 1 in conjunction with FIG. 2 there is shown a visual display screen 10. Associated with display screen 10 is a read/write display memory 1 wherein stored data is read out and displayed on the screen 10 in a conventional manner. An individual or a group of storage locations within the display memory 1 corresponds to individual pixels or pels of the display screen 10. The display memory 1 is coupled to a central processing unit (CPU) 2, the CPU 2 further being coupled via a bus 3 to a main memory 4 wherein instructions are loaded and stored from a mass storage device 5. Certain of the stored instructions control the CPU 2 to perform an Image Editor function, including the image Zoom or enlargement function of the invention. Other functions associated with the Image Editor include, by example, Text, Line, Sketch, Cut, Paste, Box, and Fill functions. As will be made apparent these other functions may be invoked and executed concurrently with the Zoom function. The other functions operate upon an unmagnified, 1X copy of the image stored within a World Plane (WP) image buffer in memory 4. The enlarged portion of the image that is stored within display memory 1 and displayed by screen 10 is a window or viewport, initially centered upon an image cursor, into the 1X WP image. The enlarged portion of the WP image is displayed with a logical pel size that is a function of the zoom magnification level in effect. An enlarged logical pel is comprised of some number of physical screen pels or pixels.

A data entry device such as a keyboard 6 and a mouse 7 enables a user of the system to interact with the Image Editor in a manner to be described to create, modify and store graphical images. Textual data entered is also temporarily stored in a Text Buffer (TB) within memory 4. The data stored within the display memory 1 may provide information for displaying a monotone or a color image, depending upon the characteristics of the particular system display screen 10. In a preferred embodiment of the invention the display screen 10 displays color images.

The ZOOM function of the invention provides seven user selectable levels (1X, 2X, 4X, 8X, 16X, 32X and 64X) of image enlargement. A specific zoom level stays in effect until changed in magnification by another ZOOM function or until deactivated. In accordance with one aspect of the invention other Image Editor functions are usable within any of the zoom levels.

A ZOOM VIEWPORT function is controlled by a user to switch between displaying a zoom viewport 12 and not displaying the zoom viewport 12. The zoom viewport 12 is a relatively small window within the zoomed display 10 that displays in "normal" size (1X) an area surrounding a cursor 14. An enlarged, fat pel, cursor 16 within the zoomed image corresponds to the cursor 14. The zoom viewport 12 is only displayed when zooming is in effect, that is for image enlargements greater than 1X and when specifically enabled by the ZOOM VIEWPORT function.

Upon selection by a user the display screen 10 displays the image 18 enlarged in accordance with the particular zoom level in effect. The zoomed area is centered around the cursor 14. The zoom level remains in effect until either changed by a later ZOOM function or until deactivated by an ESC code entered while in an idle state. The entry of the ESC code restores the normal display (zoom level 1X).

In accordance with the invention all Image Editor actions are invokable and operable in whatever zoom level is in effect. By example, CUT and PASTE functions operate at all zoom levels. Further in accordance with this aspect of the invention alphanumeric text may be entered with the TEXT function, an image may be saved to disk or drawing can be accomplished while the ZOOM function is invoked. That is, the zoom mode becomes a state of the Image Editor in that invoked actions are performed upon the unmagnified copy of the image within the WP buffer with a normal 1X pel size but are displayed to the operator in an enlarged, fat pel, equivalent. For example, when entering text while in zoom mode the text is written to the 1X TB in a normal, unmagnified, size as determined by the font and point size in use independently of the zoom level in effect. However, text occurring within the zoom window is displayed enlarged to the current zoom level. Upon a return to normal view (1X) the text appears in the proper size for the standard 1X screen display. When entering text with a large zoom level in effect, such as 64x, the text field may not fit within the screen display. The invention provides for automatically panning the display as needed to keep up with the cursor 16 position.

By example, one Image Editor function is known as FILL. If required by a particular image the FILL function also fills image areas outside of the currently displayed zoom window. Thus, the operation of the FILL function proceeds in a normal (1X) fashion regardless of the zoom level currently in effect. Similarly a PASTE function pastes down a full paste buffer (PB) area, displayed in a properly enlarged format, even though the PB extends beyond the boundaries of the enlarged display. It is noted that write to disk functions such as SAVE and SAVE AND EXIT write the 1X version of the current image to disk even when the ZOOM function is displaying an enlarged view of the image. If desired the enlarged view may be saved to disk using a RESIZE function to generate the enlarged view. The RESIZE function generates an enlarged view of an image at a normal, physical, pel size that becomes a new 1X image. The new 1X image is then stored using SAVE.

If the ZOOM VIEWPORT function is enabled the zoom viewport 12 is generated and displayed at a corner of the display 10 whenever a zoom level other than 1X is in effect. The zoom viewport 12 displays in 1X magnification a portion of the image surrounding the cursor 14 location. The zoom viewport 12 thus provides a perspective of the location of cursor 16 within the 1X WP image. The presence of the zoom viewport 14 also indicates to a user that a ZOOM function is in effect. Upon selection by the operator the ZOOM VIEWPORT function determines either whether the viewport 12 is displayed (ON) during zoom mode or whether it is not displayed (OFF). The option selected remains in effect until changed to the opposite state by another ZOOM VIEWPORT function.

Figure 3:
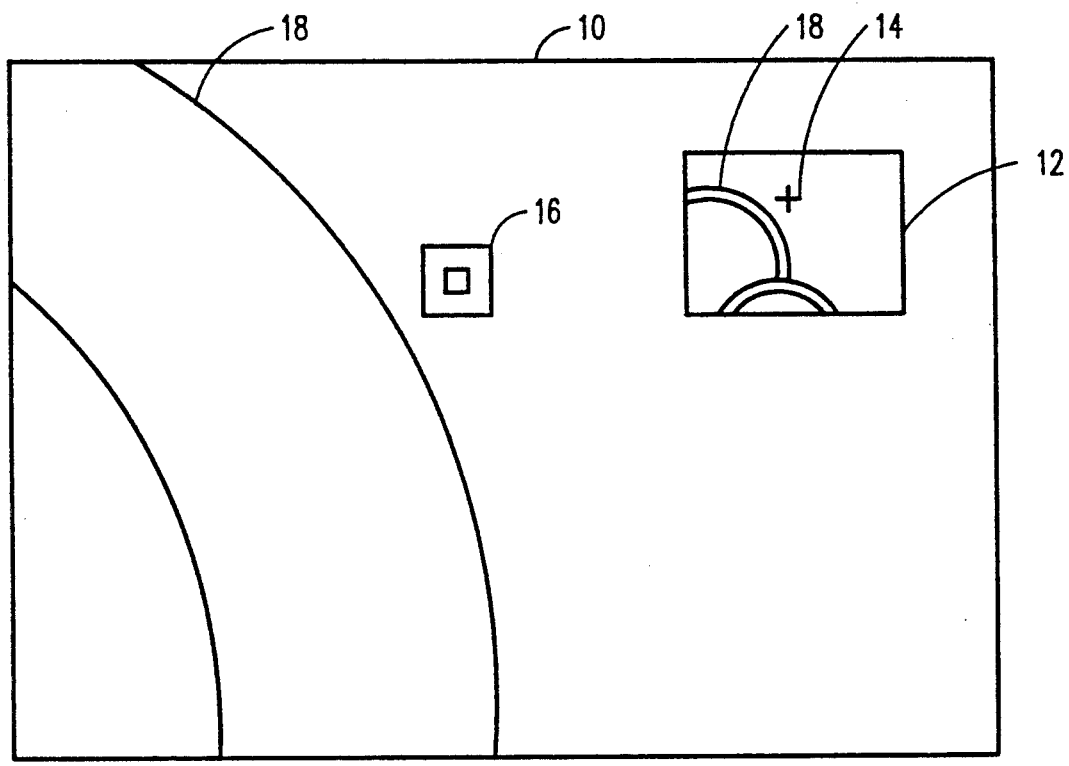
FIG. 3 illustrates the display screen and shows a magnified portion of an image and a viewport showing an unmagnified portion of the image, both the screen and viewport having an associated cursor.

As the operator repositions the cursor 16 within the magnified image window the cursor 14 moves to reflect the cursor 16 position within the 1X WP image copy. As cursor 16 is panned across the enlarged image the cursor 14 of the viewport 12 moves relative to the image area approximately in unison. The portion of the 1X image contained within viewport 12 changes only when the cursor 14 intersects an edge of the viewport 12. This condition is detected and the coordinates of an adjacent portion of the unmagnified 1X image from the WP buffer are determined and the image displayed. The adjacent portion is sized as a function of the size of the viewport window 12 and the position of the cursor 14. The newly displayed portion of the 1X image has the cursor 14 positioned at the edge of the viewport where it entered, that is opposite the edge that it initially intersected. By example, if cursor 16 movement causes the cursor 14 to intersect, in WP coordinates, the left edge of the viewport 12 of FIG. 3 CPU 2 detects this condition, accesses the 1X image copy and displays the adjacent image portion in viewport 12. In the newly displayed portion the cursor 14 is positioned adjacent to the right edge of the viewport 12. Thus the viewport 12 "pans" in increments of viewport 12 dimensions rather than moving continuously as the cursor 16 and the enlarged view in the zoom window does.

Also, if the cursor 16 intersects an edge of the viewport 12 the viewport 12 is shifted to another position upon the display 10. This feature of the invention enables the zoom area previously under or behind the viewport 12 to be displayed and accessed.

It should be noted that the style of cursor in viewport 12 is the same as the style of cursor specified for use in the Image Editor. At any time while in zoom mode a change in cursor style also changes the style of cursor 14. By example, the cursor 14 may have the shape of a cross, a dot or may be invisible.

While in zoom mode the cursor 16 is a square shaped group of visually distinct pels having a transparent center region. When the cursor 16 reaches an edge of the display 10 any further attempted cursor movement in the same direction causes the screen 10 to pan in order to accommodate the continuing movement of the cursor 16. Such panning and cursor movement stops when an actual edge of the WP image within memory 2 is reached. By example, when cursoring left and upon reaching the edge of the current display 10 further cursoring left continues, assuming the image edge is not yet reached, and the screen view pans in unison to keep up with the location of the cursor. In this case image pels on the right edge of the display are pushed off to the right as new pels push on from the left edge to show the newly displayed portion of the image. The WP image is similarly accessed and displayed for cursor 16 movement that occurs when moving right, up or down.

During the display of enlarged zoom views of an image the cursor 16 moves in increments appropriate for the zoom level. For example, when at a magnification level of 64X, movement typically occurs in increments of a single, enlarged pel. In this regard it is noted that at magnifications above 1X that the cursor 16 is moving in "logical" pels and not in "physical" pels. By example, if zoom level 64X is selected the display 10 still has a physical resolution of some number of pels, such as 640×480. However, from a logical point of view the image has been enlarged such that only a few "logical" pels of the image are displayed on the screen 10. Each pel is physically sized along both x and y screen coordinates by the CPU 2 such that it encompasses a plurality of pels for display purposes, but each enlarged "fat" pel represents but a single logical pel of the image. From a ZOOM function perspective cursor 16 movement, and the physical size of the cursor 16, corresponds to the logical pel size.

Predetermined cursor direction keys of the keyboard 6 move the cursor 16 accordingly - left, right, up, down, and in the four diagonal directions. CTRL versions of these keys, that is depressing the CONTROL key simultaneously with a cursor direction key, moves the cursor 16 directly to the WP image edges, as is done for normal, non-zoom, cursoring. SHIFT versions of these keys move the cursor 16 in one pel increments, again as for normal cursoring.

In accordance with a further aspect of the invention there are provided other cursoring conventions when operating in the zoom mode. ALT versions of predetermined keyboard keys, preferably the numeric keypad cursor keys, move the cursor 16 directly to the edges of the currently displayed image, thereby keeping cursor 16 movement restricted to within the current display. ALT 5 positions the cursor 16 to the center of the currently displayed image in a manner somewhat analogous to CTRL 5 that moves the cursor to the center of the WP image.

Further in accordance with this aspect of the invention there is provided another special cursoring convention that is enabled by, in this embodiment of the invention, the CTRL Z key. When depressed this keystroke combination causes the CPU 2 to record the current cursor 16 screen coordinate position and thereafter center the cursor 16 and the surrounding enlarged portion of the image at the middle of the display screen 10. The effect of this keystroke combination is to center an enlarged view of the image around a current location of the cursor 16. If not in zoom mode when this keystroke combination is entered CPU 2 instead invokes the zoom mode and establishes the display screen 10 accordingly, using the zoom level last selected during a previous zoom mode operation.

If the zoom viewport 12 is enabled during the direct cursoring accomplished in conjunction with the ALT, SHIFT and CTRL keys the zoom viewport 12 is updated in unison with whatever changes occur in the cursor 16 location and screen display.

Depressing another predetermined key, in this case ESC, terminates the zoom mode if no other Image Editor functions are also invoked. Terminating the ZOOM function causes the screen 10 to display a normal 1X image. By example, if drawing a box while in zoom mode, pressing ESC while in the midst of sizing an elastic box outline causes an escape from the BOX function back to an Image Editor idle state. A zoom level presently in effect, such as 32X, continues. If the BOX action is instead terminated normally, subsequentially pressing ESC terminates the ZOOM function. Termination of the ZOOM function causes CPU 2 to save the current zoom state including the current zoom level, for example 32X, and whether the zoom viewport is on or off. When the ZOOM function is again invoked the saved parameters are retrieved and used to initially establish the zoom processor state. Termination of the zoom function also releases the WP buffer area.

Figure 4:
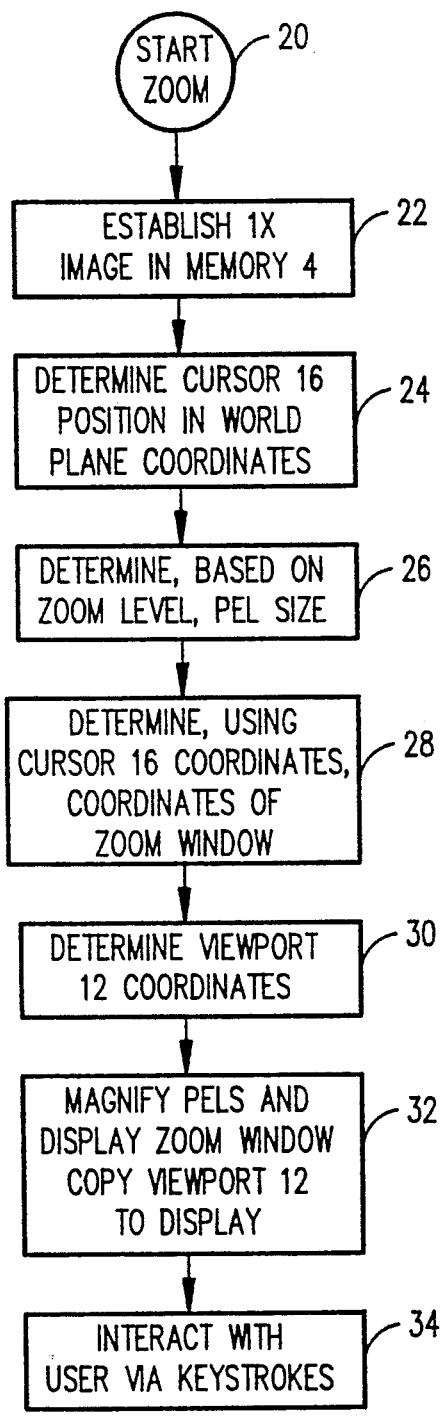
FIG. 4 is a flow chart that illustrates a method of initializing the zoom function of the invention.

Referring to FIG. 4 there is shown in block diagram form the initialization of the ZOOM function. At block 20 CPU 2 recognizes a CTRL Z keystroke from keyboard 6 and invokes the ZOOM function. At block 22 the 1X WP image is established in the WP buffer. In this regard it is noted that if a 1X image already exists the image is copied from display memory 1 into the WP buffer. At block 24 the position of the user positioned cursor is determined within the image, the cursor position being referenced to the coordinates of the WP image. At block 26 a current zoom level is determined and the corresponding expanded logical pel size is calculated. The initial zoom level is set to the level in effect when the ZOOM function was last terminated. At block 28 the coordinates of the zoom window are determined, that is, what portion of the copy of the 1X image in the WP buffer will be displayed in an enlarged format within the zoom window. The coordinates of the zoom window are a function of the cursor position, in that the window is centered on the cursor, the zoom level and the size of the zoom window. Next, at block 30, the coordinates of the viewport 12 are determined. The viewport 12 is nominally defined to have an area equal to approximately one sixteenth of the zoom display window. The zoom display window normally occupies substantially the entire available area of the display screen 10. At block 32 the CPU 2 accesses those 1X pels within the WP buffer that lie within the calculated coordinates of the zoom window. The accessed pels are expanded in accordance with the calculated logical pel size and are written to the display memory 1, thereby creating the expanded image. Also, the 1X pels from the WP buffer are copied to the display memory 1 such that the viewport 12 appears in a corner of the zoom window. Thereafter, the CPU 2 interacts with a user via the keyboard 6 and/or mouse 7 to pan through the image and to invoke other of the image editor functions.

In accordance with another aspect of the invention the zoom level may be changed while the ZOOM function is invoked. An operator changes the magnification level via the keyboard 6 and the CPU 2 recalculates the logical pel size and the zoom window coordinates. The zoom window coordinates are a function of the present position of the cursor within the 1X image in that the cursor is by definition taken to be the center of the window. That is, blocks 24-34 of the flowchart of FIG. 4 are executed. While the invention has been particularly shown and described with respect to a preferred embodiment thereof, it will be understood by those skilled in the art that changes in form and details may be made therein without departing from the scope and spirit of the invention.

Having thus described my invention, what I claim as new, and desire to secure by Letters Patent is:

1. In a system having image display means comprising a plurality of physical pels, a method of operating an image editor in response to input from a user of the system, the method comprising the steps of:

displaying a magnified portion of a first image as a second image comprised of a plurality of logical pels having a size that is a function of a magnification level in effect, the second image having a first cursor positioned therein;

displaying within the second image a viewport containing a portion of the first image, the portion corresponding to the magnified portion, the viewport having a vertical and a horizontal dimension corresponding to a plurality of physical pels of the first image and further having a second cursor having a position that corresponds to the position of the first cursor;

responsive to the user repositioning the first cursor such that the first cursor would be located outside of the displayed second image, shifting the second image in increments of logical pels in unison with movement of the first cursor; and responsive to the second cursor reaching a first edge of the viewport in response to the movement of the first cursor, shifting the viewport by a plurality of physical pels that correspond to the vertical or the horizontal dimension of the viewport such that the second cursor is positioned substantially adjacent to a second edge of the viewport that is oppositely disposed to the first edge.

* * * * *